Aug. 27, 1968
E. BRICHARD
3,399,047
MELTING FURNACE FOR MANUFACTURING FLAT GLASS
Filed Feb. 26, 1965
3 Sheets-Sheet 1
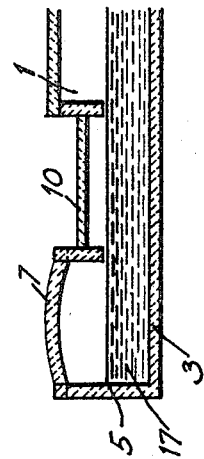
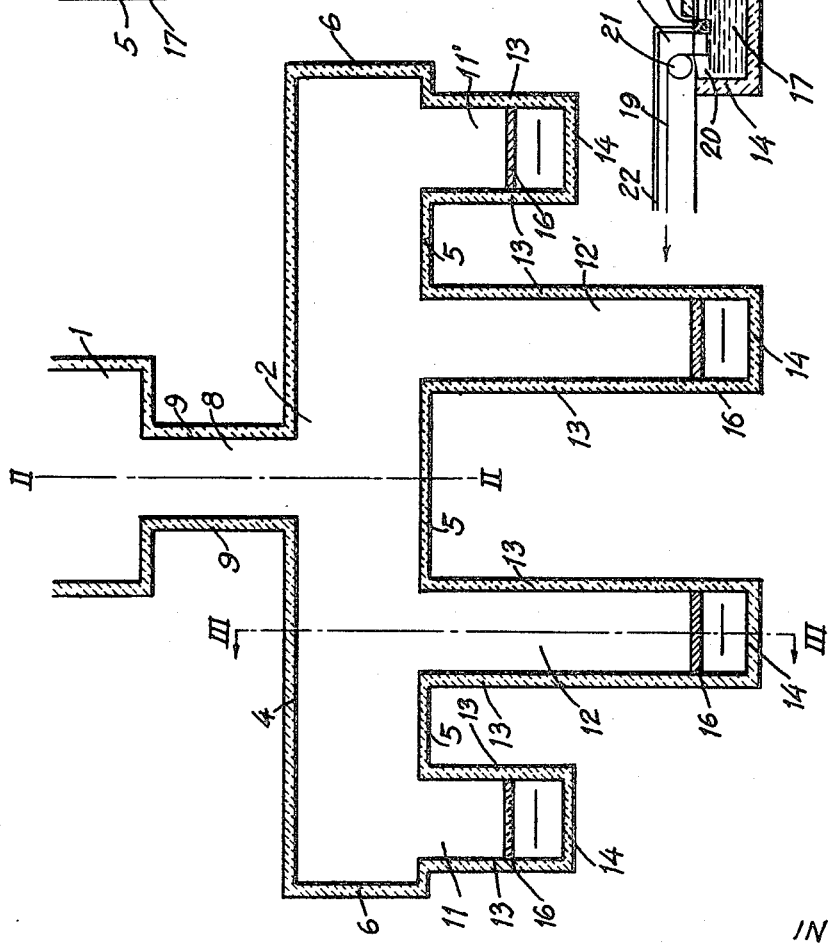
INVENTOR
EDGARD BRICHARD
BY
Toulmin & Toulmin
ATTORNEYS Aug. 27, 1968  E. BRICHARD  3,399,047
MELTING FURNACE FOR MANUFACTURING FLAT GLASS
Filed Feb. 26, 1965  3 Sheets-Sheet 2

INVENTOR
EDGARD BRICHARD
BY
Toulmin & Toulmin
ATTORNEYS

INVENTOR
EDGARD BRICHARD

BY

Toulmin & Toulmin
ATTORNEYS

United States Patent Office 3,399,047
Patented Aug. 27, 1968

3,399,047
MELTING FURNACE FOR MANUFACTURING
FLAT GLASS
Edgard Brichard, Jumet, Belgium, assignor to
Glaverbel, S.A., Brussels, Belgium
Filed Feb. 26, 1965, Ser. No. 435,576
Claims priority, application Luxembourg, Mar. 11, 1964,
45,637
8 Claims. (Cl. 65—346)

ABSTRACT OF THE DISCLOSURE

A plant for manufacturing flat glass by means of more than two horizontal annealing lehrs fed by a single melting and refining furnace, the plant including, for delivering molten glass from the furnace to the lehrs, a narrow feeding canal communicating with the furnace and extending parallel to the longitudinal axis thereof, a relatively long conditioning compartment extending perpendicular to the longitudinal axis of the melting furnace, and more than two distributor canals connected to the conditioning compartment at different locations therealong and extending perpendicular to the length of the compartment, each distributor canal distributing molten glass to a respective lehr.

The present invention relates to a plant for manufacturing flat glass from a molten glass mass, having one melting and refining furnace which leads into a conditioning compartment from which a plurality of distributor canals with a shaping unit each leading to an annealing lehr each, extends, thus forming more than two working units in connection with one melting and refining furnace.

Up to now, only two working units have been connected with one melting and refining furnace in arrangements having horizontally disposed annealing lehrs.

Each glass sheet forming unit is generally fed with molten glass by a canal extending from a melting and refining furnace. A plant consisting of two glass sheet forming units has thus two distributor canals disposed side by side and prolonging the furnace in the direction of the latter's longitudinal axis. The width of the space occupied by the canals does not exceed or slightly exceeds the width of the furnace so that the furnace and the canals nearly form a rectangle.

This universally accepted disposition leads to serious inconveniences among which one of the most serious ones appears whenever a working unit stops. The glass streams which circulate in the melting furnace are strongly influenced by convective streams flowing back from each of both canals. Whenever a working unit out of the two units stops with the result that the output of the furnace is reduced to 50% and whenever no molten glass flows into a canal, the condition of the glass streams is profoundly modified in this canal and this modification consequently disturbs the condition of the glass streams in the furnace itself. The result is that the glass stream feeding the unit which is kept in operation is also disturbed, which fact unfavorably influences the operation of this unit. A further drawback of connecting one melting and refining furnace with only two working units is that the minimum capacity of a melting and refining furnace is simply too large for only two working units. This means that a plant consisting of one melting and refining furnace and two working units is uneconomical because the capacity of the furnace is not fully utilized.

Consequently, it is an object of the present invention to provide a manufacturing plant for plate glass comprising one melting and refining furnace in connection with more than two working units.

It is a further object of this invention to provide a glass manufacturing plant in which a conditioning compartment is interposed between the furnace and the working units, this compartment being arranged perpendicularly to the longitudinal axis of the melting furnace.

It is another object of this invention to provide a glass manufacturing plant in which the canal connecting the melting and refining furnace with the conditioning compartment is narrow in width.

It is still another object of this invention to provide a glass manufacturing plant in which the overall length from the exit of the melting and refining furnace to the end of each distributor canal is substantially the same.

Other objects and advantages of this invention will be apparent upon reference to the accompanying description when taken in conjunction with the following drawings, wherein:

FIG. 1 is a plan view of a plant composed of four glass sheet drawing machines;

FIGS. 2 and 3 show two sections of FIG. 1 along lines II—II and III—III, respectively;

Figure 4:
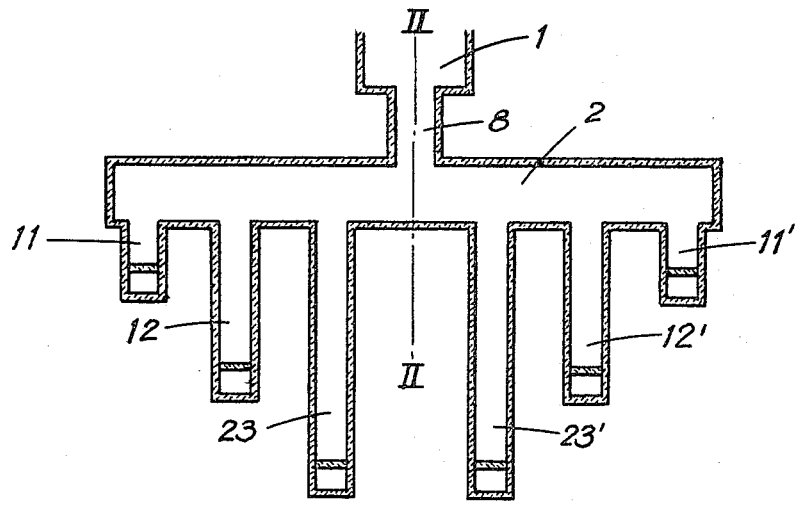
FIGURES 4 to 6 show some types of plants composed of six and three machines, respectively.

The plant, shown in FIGS. 1, 2 and 3, is composed of a melting and refining furnace 1 and of a conditioning compartment 2, this compartment consisting of bottom 3, walls 4, 5, 6 and arch 7 covering said compartment.

The compartment 2 is disposed perpendicularly to the longitudinal axis II—II of the melting furnace and is connected to the latter by means of a feeding canal 8, formed by bottom 3, walls 9 and arch 10 and running into the middle part of wall 4 of compartment 2. On the side, opposite to the melting furnace 1, the compartment 2 has four distributor canals 11, 11'–12, 12', parallel to the axis II—II and symmetrically disposed on each side of said axis. These canals are formed by bottom 3, side walls 13, end-wall 14 and arch 15 which extends to a baffle 16 situated at a small distance from the wall 14 and reaching into the mass of molten glass 17. The zone separated from the rest of said canal by the baffle 16 is the glass sheet shaping unit schematically shown in 18 (FIG. 3) and in which a glass sheet 19, drawn from the surface 20 of the molten glass mass 17 is bent on a bending roll 21 and directed to a horizontal annealing lehr 22.

FIG. 4 shows a plant composed of six machines, whereas the glass sheet conditioning compartment 2 has, on its side opposite to the furnace, six distributor canals 11, 11'–12, 12'–23, 23', situated on each side of the axis II—II in a parallel direction to the latter.

Figure 5:
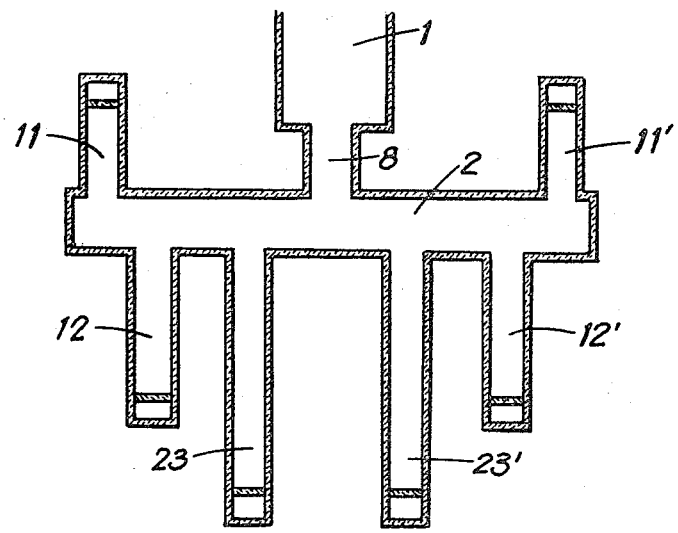

FIG. 5 shows, as an alternative solution, a plant also composed of six machines but in which two distributor canals 11 and 11' are connected to the side facing the furnace.

Figure 6:
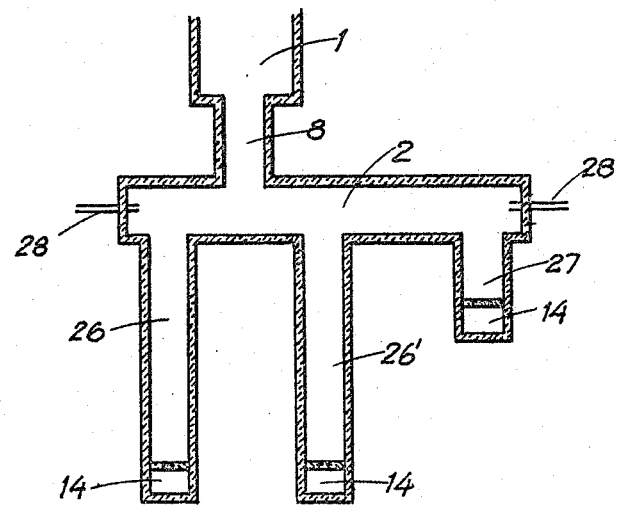

The plant shown in FIGURE 6 is composed of three machines. According to FIG. 6, their disposition is an asymmetrical one. It is to be noted that in all the constructions shown as an example, each machine has at least a side-face which is not facing another machine. This means that the work at the machine can be done more easily and is not so hard on the workmen.

Moreover, the plant shown in FIGURE 6 is equipped with burners 28 placed in the end-walls of the glass conditioning compartment so as to keep the molten glass uniformly heated.

The plant, according to the invention, is such that a satisfactory and stable uniformity of the glass with which the glass sheet forming units are fed, is insured from a thermical point of view. The improved plant considerably reduces the disturbing effect caused by one of the units being stopped so that this effect can be made negligible. It makes it possible to use the furnace to the maximum of its capacity, whereas the working units can be adjusted with an increased flexibility. Moreover, it is also possible to simultaneously manufacture a wide range of products.

This is why the plant, according to the invention, comprises a molten glass conditioning compartment 2, with a canal 8, connected to the melting furnace 1 and disposed perpendicularly to the latter's longitudinal axis and of distributor canals connected to at least one of the sides of said conditioning compartment 2, each of these distributor canals feeding one working unit. Said compartment 2 is advantageously connected to the melting furnace 1 by means of a canal 8 which is narrower than said furnace. The narrow canal aims at concentrating into a narrow bundle the glass streams which have been formed in the furnace 1 and the various temperatures of which are to be made uniform. It has been observed that upon using the universally adopted arrangement of the glass sheet forming units, temperature uniformity can be reached only very approximately and the glass streams, the temperatures of which considerably vary, are not mixed together. These glass streams then continue to progress toward the working units, whereas they deviate very little from the initial direction parallel to the axis of the furnace. It was found that, because of the lengthened form of the conditioning compartment 2 which is perpendicular to the axis of the furnace 1, the bundle of glass streams of various temperatures spread out widely at the outlet of the canal 8 in directions more or less perpendicular to the axis of the furnace. The result is that the glass streams are yet more intimately mixed together as a consequence of the direction of the glass stream being forcibly changed when entering into the distributor canals.

Moreover, whenever one of the working units stops, the condition in the glass conditioning compartment 2 is maintained because the glass stream flowing out of the canal 8 continues to spread, this spreading being maintained by the mass of molten glass consumed by the working units which are kept in operation.

The distributor canals 11, 11'-12, 12' are preferably disposed in a parallel direction to the longitudinal axis of the melting furnace and symmetrically with this axis.

It is desirable that the molten glass reaches each working unit at an identical temperature, namely at the same working temperature. This result can be obtained by any usual means, that is to say by dams, coolers, etc. But this equalization of the temperatures can be more advantageously reached by giving the distributor canals unequal lengths so that the working units may be staggered and situated at least on two lines, in a parallel direction to the longitudinal axis of the glass conditioning compartment. This disposition is of a particular interest because for each unit there is at least one working door which does not face the one of the neighboring unit. In front of each unit, there is a space which is reserved to the unit's own and exclusive service so that the operators do not have to work so hard and in unhealthy conditions as in the case when the work has to be done between two units of which the working doors are facing each other.

Finally, this disposition is such that burners 28 can advantageously be placed on the sides of the glass conditioning compartment so that the glass can eventually be reheated and thus kept at a uniform temperature.

As the drawing shows, the lengths of the distributor canals 11, 11'-12, 12'-23, 23'-25, 25'-26, 26'-27 are chosen in such a manner that the length of each of the distributor canals added to the length from the connecting point between the feeding canal with the conditioning compartment to the connecting point between the conditioning compartment with the respective distirbutor canal results in the same overall length. This can be seen in the drawing (FIGS. 1 and 4–6). The farther a distributor canal is removed from the melting and refining furnace 1, the shorter it is. And the shorter it is, the longer is the portion of the conditioning compartment 2 leading to it.

It will be understood that this invention is susceptible to modification in order to adapt it to different usages and conditions and, accordingly, it is desired to comprehend such modifications within this invention as may fall within the scope of the appended claims.

What is claimed as this invention is:

1. Apparatus for manufacturing flat glass from a molten glass mass comprising, in combination: a melting and refining furnace; a feeding canal leading out of said melting and refining furnace; a conditioning compartment connected to receive molten glass from said feeding canal and arranged so that its longitudinal axis extends in a direction perpendicular to the longitudinal axis of said furnace; at least three distributor canals each communicating with said compartment and leading away therefrom at different locations in a direction substantially parallel to the longitudinal axis of said melting and refining furnace, each of said canals being laterally offset from the longitudinal axis of said furnace; and one shaping unit with one annealing lehr each provided at the end of each of said distributor canals, thus forming a plurality of working units.

2. An arrangement for manufacturing flat glass, as defined in claim 1, wherein said feeding canal is narrower than the width of said melting and refining furnace.

3. An arrangement for manufacturing flat glass, as defined in claim 1, wherein the length of each of said distributor canals added to the length from the connecting point between the feeding canal with the conditioning compartment to the connecting point between the conditioning compartment with the distributor canal results in the same overall length.

4. An arrangement for manufacturing flat glass, as defined in claim 1, wherein said distributor canals are disposed symmetrically along said conditioning compartment.

5. An arrangement for manufacturing flat glass, as defined in claim 1, wherein said distributor canals with their respective shaping units with annealing lehrs all extend in the same direction.

6. An arrangement for manufacturing flat glass, as defined in claim 1, wherein said distributor canals with their respective shaping units with annealing lehrs extend in opposite directions.

7. An arrangement for manufacturing flat glass, as defined in claim 1, wherein burner means are provided at the extreme ends of said conditioning chamber so as to keep the molten glass uniformly heated.

8. An arrangement as defined in claim 1 wherein the length of said compartment is substantially greater than the width of said furnace.

References Cited

UNITED STATES PATENTS 3,241,940   3/1966   Zellers _____ 65—337 X

FOREIGN PATENTS 617,643   11/1926   France.
1,264,348   5/1961   France.

S. LEON BASHORE, *Acting Primary Examiner.*

ARTHUR D. KELLOGG, *Assistant Examiner.*